Dec. 3, 1963 R. A. HODGSON 3,112,881
REVERSIBLE THERMAL REGULATOR FOR BURNER FUEL SUPPLY
Filed Aug. 11, 1960 3 Sheets-Sheet 1
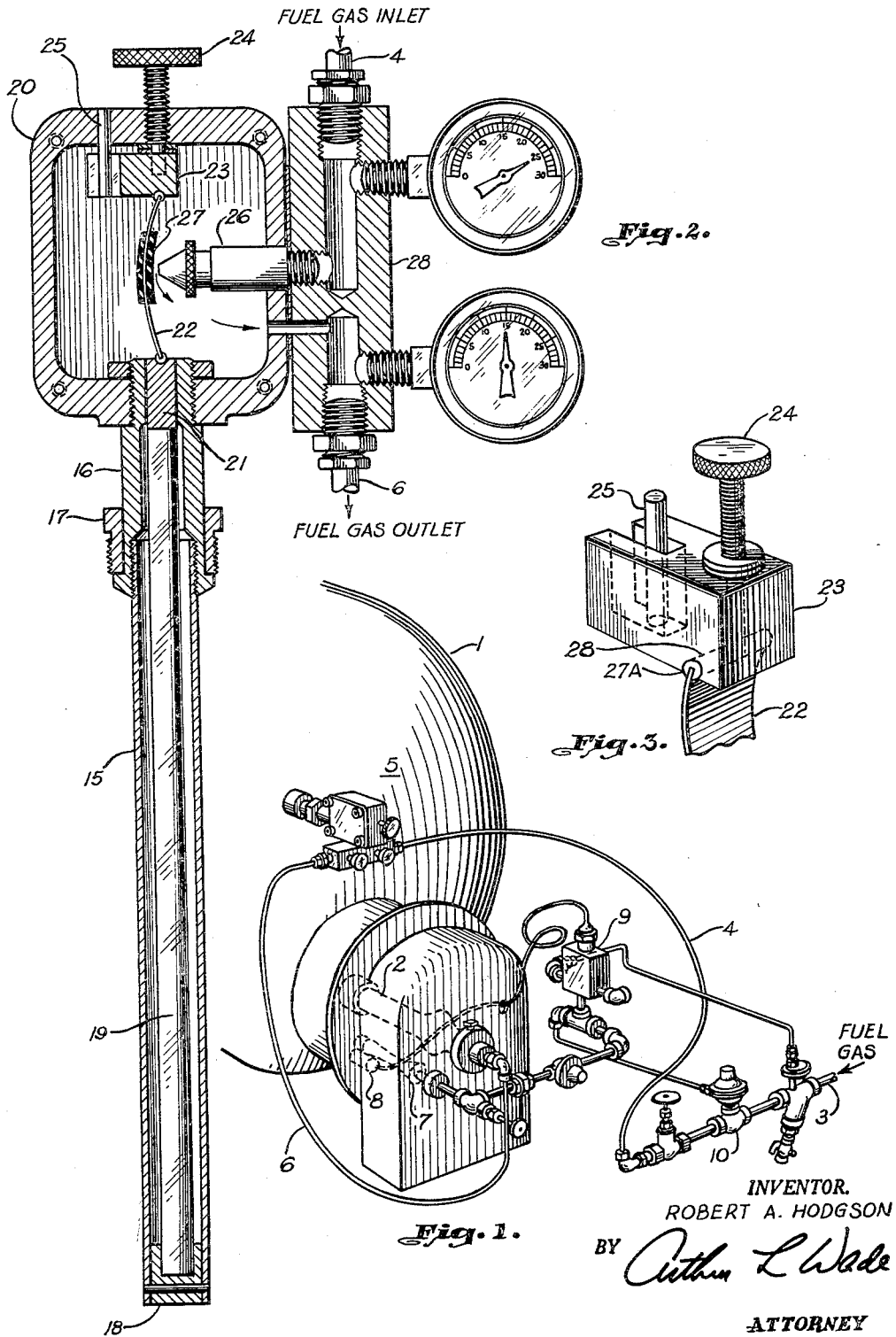
INVENTOR.
ROBERT A. HODGSON
BY Arthur L Wade
ATTORNEY

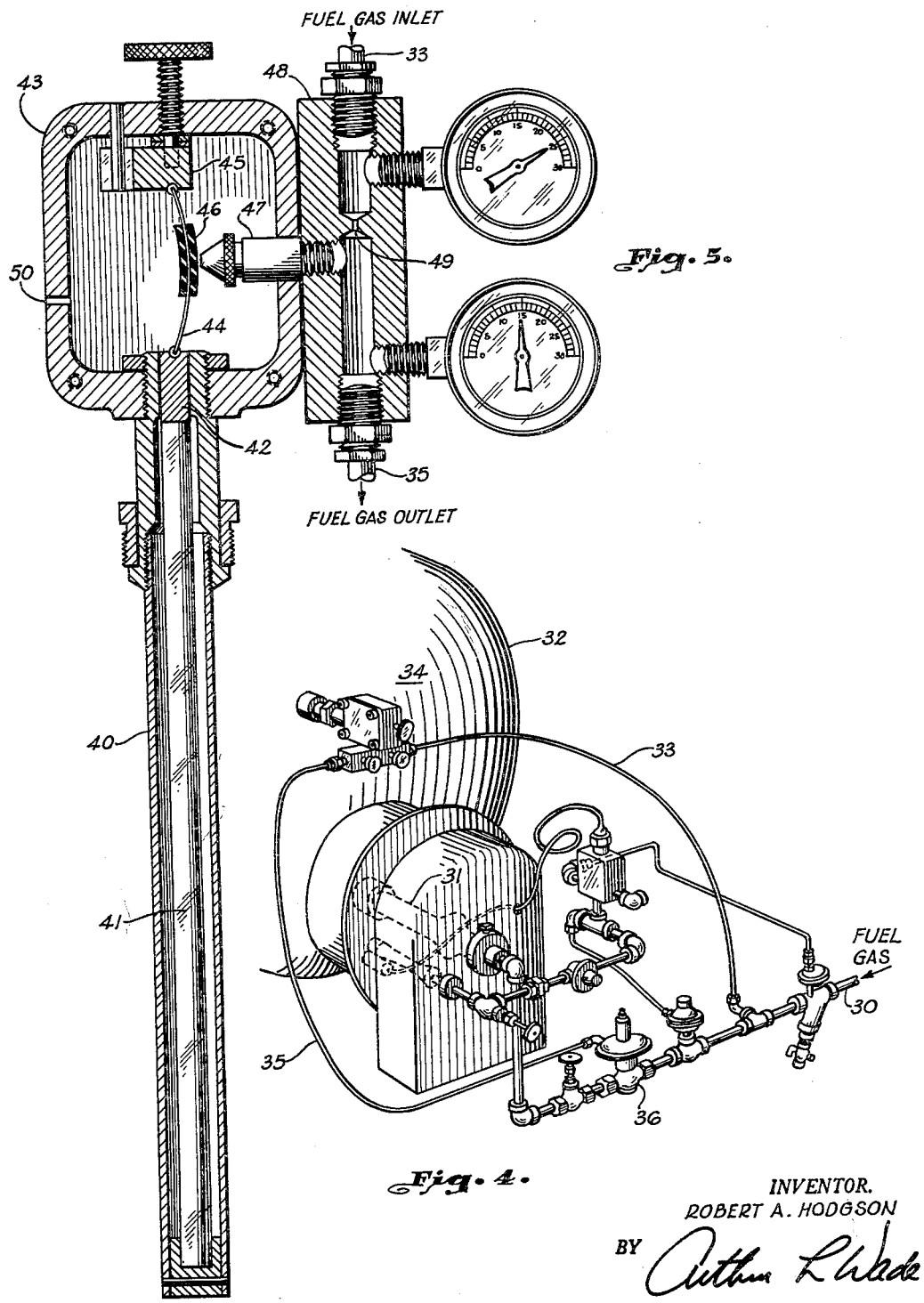

Dec. 3, 1963  R. A. HODGSON  3,112,881
REVERSIBLE THERMAL REGULATOR FOR BURNER FUEL SUPPLY
Filed Aug. 11, 1960  3 Sheets-Sheet 3
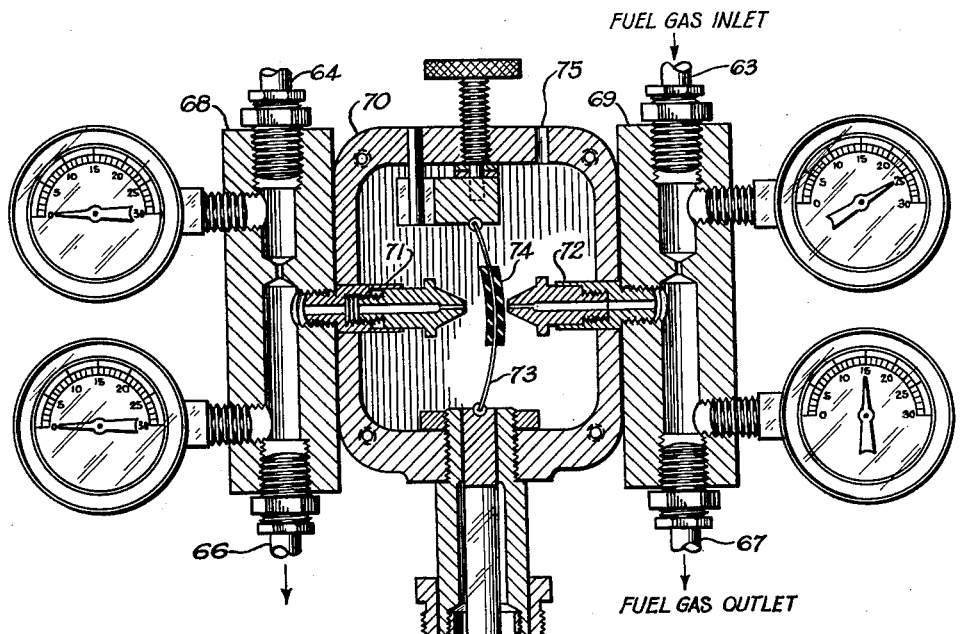
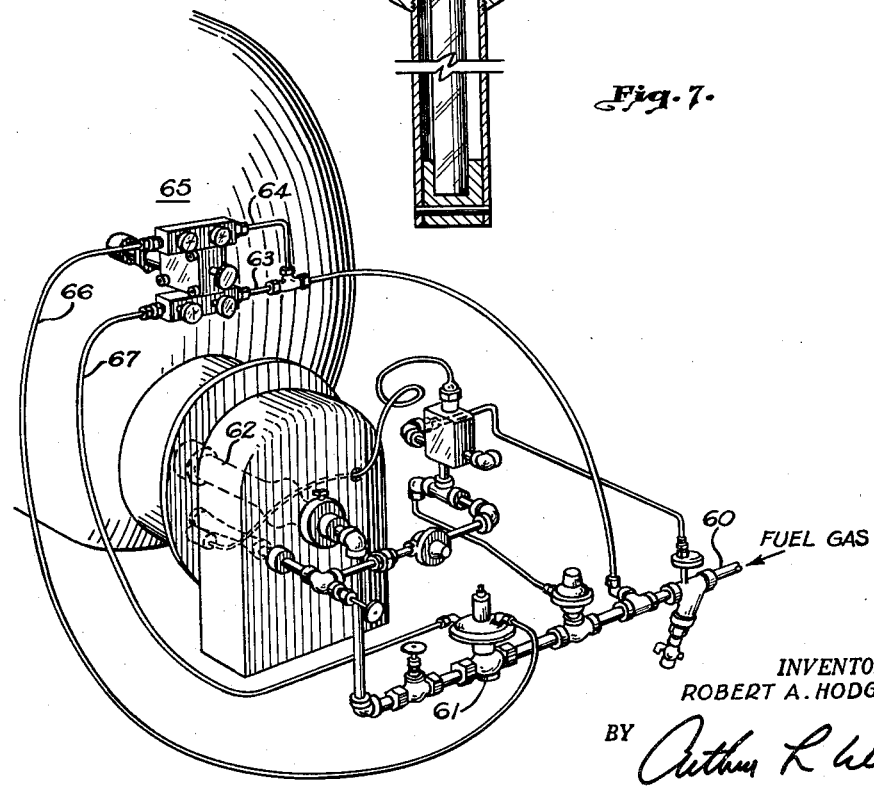
INVENTOR.
ROBERT A. HODGSON
BY Arthur R. Wade
ATTORNEY

United States Patent Office 3,112,881
Patented Dec. 3, 1963

3,112,881
REVERSIBLE THERMAL REGULATOR FOR
BURNER FUEL SUPPLY
Robert A. Hodgson, Tulsa, Okla., assignor to National
Tank Company, Tulsa, Okla., a corporation of Nevada
Filed Aug. 11, 1960, Ser. No. 48,965
3 Claims. (Cl. 236—102)

The present invention relates to controlling temperature by utilizing the dimensional change of material exposed to the temperature controlled.

There is a problem in developing an indication and/or control impulse from the relatively small dimensional change of primary elements responding directly to temperature conditions. These small changes in dimension over a selected temperature range must be greatly amplified to develop effective control action.

The primary object of this invention is to amplify dimensional changes in a member exposed directly to a temperature to be controlled and to develop a fluid pressure with the amplified movement which may be employed to regulate the heat source propagating the temperature.

Another object is to provide adjustment of the control set point of a system which uses a dimensional change of a primary element to develop a fluid pressure applied to regulate the heat source.

Another object is to provide an arrangement of parts which can be readily adjusted to reverse the relation of the direction of change of a temperature to the direction in change of a fluid pressure exhibiting the temperature change.

The present invention contemplates a first longitudinally extended member which will change length when exposed to temperature. This first longitudinal member has a bore in which a second longitudinal member of relatively low coefficient of dimensional change is moved in a first direction by the shortening of the first longitudinal member. A spring member moves the second longitudinal member in the second direction by the lengthening of the first longitudinal member, the spring then simultaneously functions to control the nozzle discharge of a system which develops a fluid pressure from a source of fluid pressure supply.

Other objects, advantages and features of this invention will appear from a consideration of the drawings together with the written specification, appended claims and attached drawings wherein:

FIG. 1 is an isometric illustration of a complete system which the present invention is embodied to control fuel gas directly;

FIG. 2 is a sectioned elevation of a temperature controller embodying the present invention and incorporated in the system of FIG. 1;

FIG. 3 is an isometric view of a portion of the structure of FIG. 2;

FIG. 4 is an isometric illustration of a second system in which the present invention is embodied to develop a pilot fluid pressure;

FIG. 5 is a sectioned elevation of another temperature controller embodying the present invention and incorporated in the system of FIG. 4;

FIG. 6 is an isometric illustration of a third system embodying the present invention to approach on-off control action with throttling action; and FIG. 7 is a sectioned elevation of a third temperature controller embodying the present invention and incorporated in the system of FIG. 6.

SYSTEM OF FIG. 1

In FIG. 1 a vessel 1 is indicated as being heated by gas being burned from a burner 2. Fuel gas for burner 2 enters the system by conduit 3. From conduit 3, the fuel gas is discharged through an extension conduit 4 which introduces the fuel gas into a temperature controller 5. Temperature controller 5 includes a primary element directly responsive to the temperature of the medium heated by burner 2 and temperature controller 5 regulates the amount of fuel gas passed to burner 2 by conduit 6.

A lighting burner 7 is also supplied fuel gas from conduit 3 under the control of temperature sensitive bulb 8 attached to burner 7. The fuel gas of conduict 3 is passed through the valve of monitoring mechanism 9. The heat at lighting burner 7 will cause the bulb 8 to develop a fluid pressure which is applied to maintain the valve of monitor 9 open and therefore valve 10, in conduit 3, open.

TEMPERATURE CONTROLLER 5

The primary element of temperature controller 5 is illustrated in FIG. 2 as an aluminum tube 15 mounted on adaptor 16 which is, in turn, mounted in the wall of vessel 1 with packing nut 17. Aluminum tube 15 is inserted directly into the medium heated by the flame propagated by burner 2. Tube 15 is preferably constructed of a metal, such as aluminum, which has a high coefficient of expansion to develop a travel length which will vary over a desired range as the temperature to which it is exposed varies.

An end piece 18 is pinned within the external end of tube 15 to form a socket for an end of an internal rod. Rod 19 is preferably of a material such as glass, which has a relatively low coefficient of expansion. This rod 19 forms a mechanical link with the internal end of tube 15 for transmitting the motion of the tube 15 to a fluid pressure mechanism within housing 20.

Adaptor 16 extends from the mounted end of tube 15 and packing nut 17 to mount housing 20 on its other end. Adaptor 16 is formed with the bores necessary to receive the end of rod 19 and a follower 21. Follower 21 rests on the end of rod 19 to transmit its motion to a bowed spring steel member 22. The other end of spring 22 rests in adjusting block 23. Adjusting block 23 is positioned within housing 20, along the axis of rod 19, by adjusting screw 24 and guide pin 25.

A nozzle 26 is mounted within housing 20 to bring the fuel gas of conduit 4 into housing 20. A rubber pad 27 is mounted on spring 22 to act as a flapper with nozzle 26 in regulating the fuel gas admitted to housing 20. Fuel gas within housing 20 is conducted therefrom by conduit 6 for burner 2. Representative values of pressure are indicated by gages mounted on the nozzle block 28 and connected to conduits 4 and 6.

Spring 22 serves at least two purposes in the disclosed arrangement. First, spring 22 exerts a constant force on follower 21 and rod 19 to maintain rod 19 seated in tube end piece 18. Therefore, as tube 15 expands, increases its longitudinal dimension, follower 21 will move outwardly of housing 20 under the force of spring 22 and spring 22 will become less bowed and approach nozzle 26. The resulting throttling of fuel gas from nozzle 26 will decrease the firing rate of burner 2 to halt the lengthening of tube 15 by the heat propagated by burner 2. Thus, spring 22, with pad 27 mounted thereon, serves to move rod 19 in one direction while throttling fuel gas from nozzle 26. The cooling of tube 15 will move rod 19 and follower 21 against spring 22 to bow it away from nozzle 26 and increase the rate of fuel to burner 2. Adjustment of the set point of this arrangement is established by moving adjustment block 23 along guide 25 by manual manipulation of adjustment screw 24.

FIG. 3 has been established to illustrate how each end of spring 23 is carried in its respective support. Both the end of spring 22 engaged by follower 21 and the opposite end of spring 22 engaged by adjustment block 23 has the arrangement illustrated in FIG. 3.

As illustrated most clearly in FIG. 3, each end of spring 22 is clamped by a pin 27A which rests in a groove 28. Groove 28 is a portion of a hole whose center is below the plane of the surface in which it is formed. Pin 27A, with the end of spring 22 clamped by its longitudinal slot, is slipped into groove 28 from one end. Each pin 27A on the ends of spring 22 rotates in its respective groove 28 as spring 22 bows under its end forces.

CONTROL SYSTEM OF FIG. 4

The control system illustrated in FIG. 4 is somewhat similar to the system illustrated in FIG. 1. However, in FIG. 4 the fuel gas supplied the burner is not passed through the temperature controller and directly regulated. Rather, the temperature controller illustrated in FIG. 4 develops a pilot fluid pressure from fuel gas which is applied to a control valve in the fuel gas line supplying the burner.

Fuel gas is brought to the system by conduit 30 and passed directly to burner 31 which is mounted to heat a vessel 32. Conduit 33 removes fuel gas from conduit 30 and passes the gas into temperature controller 34 which develops a fluid pressure in conduit 35 in accordance with the temperature sensed in vessel 32. Fluid pressure in conduit 35 is applied to valve 36 in conduit 30 to regulate the fuel gas burned at the tip of burner 31.

TEMPERATURE CONTROLLER 34

FIG. 5 illustrates temperature controller 34 which is similar, in many respects, to temperature controller 5 of FIG. 2. A tube 40 is illustrated as the primary element directly exposed to the heated medium of vessel 32. Rod 41 follows the dimensional variations of tube 40. Follower 42 is the mechanical link transmitting the motion of tube 40 into housing 43.

Within housing 43 spring 44 is bowed between follower 42 and adjustment block 45. Rubber pad 46 is mounted on spring 44 to directly control the discharge of fuel gas from nozzle 47.

Conduits 33 and 35 bring fuel gas to nozzle block 48 and remove the fuel gas as the pilot pressure. Orifice 49 is mounted in the passages connecting conduits 33 and 35, and nozzle 47 communicates with the passage in nozzle block 48 downstream of orifice 49. This arrangement is well understood in developing a back pressure within conduit 35 as the pilot pressure used to control valve 36.

As with nozzle 26, nozzle 47 is adjustable toward and away from the flapper pad 46 mounted on spring 44. Further, adjustment block 45 is positioned for establishing the set point. As fuel gas is controlled from nozzle 47 into housing 43, passage 50 is provided for a constant bleed to atmosphere.

In function, as tube 40 elongates under increasing temperature conditions within vessel 32, bowed spring 44 becomes less bowed, moving flapper pad 46 away from nozzle 47. The increase in flow from nozzle 47 results in a drop in the back pressure in conduit 35. The pressure in conduit 35 would then have to be applied in opposition to the spring of valve 36, the spring in valve 36 being arranged to close valve 36.

With this particular arrangement, spring 44 could be bowed in its opposite direction and nozzle 47 adjusted in length so that as the temperature condition increased, the fluid pressure developed in conduit 35 would increase. The fluid pressure of conduit 35 would then have to be applied to valve 36 to close valve 36 against its spring pressure.

Alternately, nozzle block 48, with nozzle 47, could be mounted on the opposite side of housing 43 to accomplish the reversal of relationship between temperature change and change in the fluid pressure of conduit 35. Therefore, this arrangement provides a manual adjustment of the degree of bow given to spring 44, the length of nozzle 47 and the direction from which nozzle 47 engages the flapper pad 46. With all of its simplicity, this embodiment of the invention provides a high degree of flexibility in the relationship between the condition it measures and the control action taken in response to the condition sensed.

CONTROL SYSTEM OF FIG. 6

FIG. 6 illustrates a way in which the present invention can be arranged so the throttling control action will approach an on-off type of control at a predetermined set point. Fuel gas is brought to the system through conduit 60 and used to develop two separate pilot fluid pressures for control of valve 61, regulating the fuel gas to burner 62. Conduit 63 and 64 supply separate nozzle blocks in temperature controller 65 to develop pilot fluid pressures in conduits 66 and 67. Conduits 66 and 67 are applied across the diaphragm of valve 61 and the differential developed between them is adjusted to move valve 61 positively in control of the fuel gas to burner 62.

TEMPERATURE CONTROLLER 65

The temperature controller illustrated, in part, by FIG. 7 is readily compared to the structure of temperature controller 34 of FIG. 5. Conduits 63 and 64 bring their supplies of fuel gas to nozzle blocks 68 and 69 for development of the fluid pressures in conduits 66 and 67.

Nozzle blocks 68 and 69 are mounted on opposite sides of housing 70 so nozzles 71 and 72 may be projected within housing 70 to engage opposite sides of bowed spring flapper 73, or more specifically, flapper pad 74 mounted on spring 73.

The mechanical motion generated by temperature on the primary element tube of controller 65 results in flapper pad 74 approaching nozzle 71 while moving away from nozzle 72. Therefore, an increase of pressure developed in conduit 66 will be matched by a decrease in pressure within conduit 67. The bleed from both nozzles is continually discharged from housing 70 through hole 75.

Nozzles 71 and 72, both being adjustable toward flapper pad 74, adjust the differential pressure of conduits 66 and 67 to that precise value which will move fuel valve 61 between its alternate positions. In this manner, the characteristic throttling action of fluid pressure of the control fluid pressure established by controllers 34 can be modified into what is substantially an on-off control action by temperature controller 65.

AMBIENT TEMPERATURE VARIATION

In all versions of the temperature controller, one advantage of the mounting for the ends of the spring bodies should be emphasized. The housing 20, for example, is in the form of a yoke mounted on the end of tube 15. This structure will vary in length more than the spring bodies as the ambient temperature to which they are exposed varies. As one end of spring 22 is supported on block 23, and block 23 is mounted on yoke-housing 20, the spring 22 will vary its position with respect to nozzle 26 as the yoke changes its length. Therefore, as ambient temperature rises, the temperature condition rises, if the controller set-point remains fixed. With yoke-housing 20 made of metal having a higher coefficient of expansion than the metal of the spring body 22, the greater lengthening of yoke-housing 20 under a rise of ambient temperature will cause the set-point of the controller to effectively change due to the increase in distance between the pivots for the ends of the throttling spring body 22. The movement of spring 22, relative to nozzle 26, is readily arranged to decrease the supply of fuel to the temperature condition in order to keep the condition at a constant value. Thus, if the leaf spring 22 is adjusted to regulate the flow of fuel to maintain the temperature within the vessel 1 at 200° when the ambient temperature in 70°, and the ambient temperature increases to 80°, it will be obvious that less fuel will be required to maintain a constant temperature within the vessel. The increase in the ambient temperature from 70° to 80° will cause a lengthening of the yoke housing to adjust the bow in the spring 22 and position the same closer to the nozzle 26, thus decreasing the supply of fuel and hence maintaining the temperature within the vessel constant.

From the foregoing it will be seen that this invention is one well adapted to attain all of the ends and objects hereinabove set forth, together with other advantages which are obvious and which are inherent to the apparatus.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The invention having been described, what is claimed is:

1. A control device for regulating the flow of fluid fuel to a burner to heat a vessel comprising
   a chamber,
   a nozzle mounted in said chamber through which passes fluid controlling the flow of fuel;
   a leaf spring in said chamber having two ends and of flat form arranged to throttle the fluid as the fluid is discharged from the nozzle with one of its flat sides when the spring is bowed in either of its two bowed positions;
   means for mounting the second end of said leaf spring within said chamber,
   a solid rod member bearing with a first of its ends upon the first end of the leaf spring and thereby urged in axial movement in one direction;
   a tubular body adapted to be mounted to a wall of a vessel and be exposed to a temperature condition within the vessel, the material of the body giving the body a predetermined length for each value of the temperature condition,
   and the solid rod member extending the second of its ends coaxially through the tube bore to bear on the second end of the tubular body, the first end of the rod being moved through a range of positions because the material of the rod has a coefficient of thermal expansion different from the material of the tubular body, all of which arrangement throttles the nozzle fluid discharge to establish a fuel flow to a burner in accordance with the temperature condition within a vessel, said nozzle being adjustable relative to said leaf spring so that when said spring is in one of its two bowed positions, fluid under pressure in said chamber increases with a rise in temperature and when said spring is in its other of its bowed positions fluid under pressure decreases with a rise of temperature.

2. A controller as set forth in claim 1 further characterized in that said means for mounting said second end of said leaf spring includes a block member, means for adjusting said block member for regulating the amount of bow in said leaf spring, a cylindrical pin receiving each end of said leaf spring and said pins being mounted in grooves formed in said block member and said first end of said solid rod member, said groove and pins providing pivotal connections for said leaf spring with said block member and said first end of said solid rod member.

3. A control as set forth in claim 1 further characterized in that said chamber includes a yoke member mounted on said first end of said tubular body and formed of material having a coefficient of expansion greater than the said leaf spring, a block member mounted on said yoke member a finite distance from attachment to said tubular body and bearing on said second end of said leaf spring whereby the ambient temperature changes cause the yoke member dimension between the block mounting position and attachment to the tubular body to vary more than the elongation of the leaf spring and thereby vary the distance between said nozzle and the flat side of said spring.

References Cited in the file of this patent

UNITED STATES PATENTS

| 826,735 | Mueller | July 24, 1906 |
| 862,753 | Pilcher | Aug. 6, 1907 |
| 997,424 | Snow | July 11, 1911 |
| 1,455,633 | Lundgaard | May 15, 1923 |
| 1,814,045 | Kay | July 14, 1931 |
| 1,857,386 | Lanquetin | May 10, 1932 |
| 2,065,702 | Hubbard | Dec. 29, 1936 |
| 2,824,292 | Christoph | Feb. 18, 1958 |
| 2,950,728 | Watrous | Aug. 30, 1960 |

FOREIGN PATENTS

| 99,950 | Sweden | Oct. 1, 1940 |